US012412411B2

(12) United States Patent
Kim

(10) Patent No.: US 12,412,411 B2
(45) Date of Patent: Sep. 9, 2025

(54) TRAINING OF MACHINE LEARNING MODELS USING CONTENT MASKING TECHNIQUES

(71) Applicant: SAP SE, Walldorf (DE)

(72) Inventor: Sohyeong Kim, Berlin (DE)

(73) Assignee: SAP SE, Walldorf (DE)

(*) Notice: Subject to any disclaimer, the term of this patent is extended or adjusted under 35 U.S.C. 154(b) by 348 days.

(21) Appl. No.: 18/130,955

(22) Filed: Apr. 5, 2023

(65) Prior Publication Data
US 2024/0338957 A1 Oct. 10, 2024

(51) Int. Cl.
G06V 30/19 (2022.01)
G06N 3/045 (2023.01)
G06N 3/09 (2023.01)
G06V 10/82 (2022.01)
G06V 30/14 (2022.01)

(52) U.S. Cl.
CPC ....... *G06V 30/19147* (2022.01); *G06N 3/045* (2023.01); *G06N 3/09* (2023.01); *G06V 10/82* (2022.01); *G06V 30/1448* (2022.01); *G06V 30/19007* (2022.01)

(58) Field of Classification Search
CPC ....... G06V 30/19147; G06V 30/19007; G06V 10/82; G06V 30/1448; G06N 3/09; G06N 3/045
See application file for complete search history.

(56) References Cited

U.S. PATENT DOCUMENTS

| | | | |
|---|---|---|---|
| 2021/0374395 A1* | 12/2021 | Tata | G06V 30/413 |
| 2022/0300711 A1* | 9/2022 | Elisco | G06F 16/93 |
| 2022/0300735 A1* | 9/2022 | Kelly | G06F 16/93 |
| 2023/0306205 A1* | 9/2023 | Maeder | G06F 16/3344 |
| 2024/0221407 A1* | 7/2024 | Hu | G06V 30/19147 |

OTHER PUBLICATIONS

Katti, A.R. et al. "Chargrid: Towards Understanding 2D Documents," arXiv preprint (2018): arXiv:1809.08799.
Vaswani, A. et al., "Attention Is All You Need," arXiv preprint (2017): arxiv:1706.03762.
Xu, Y. et al., "LayoutLM: Pre-training of Text and Layout for Document Image Understanding," arXiv preprint (2020): arXiv:1912.13318.

* cited by examiner

*Primary Examiner* — Christopher S Kelley
(74) *Attorney, Agent, or Firm* — Mintz Levin Cohn Ferris Glovsky and Popeo, P.C.

(57) ABSTRACT

A method for training machine learning model is provided. The method comprises extracting texts and locations of the texts from a document, generating embeddings for the document, a first set of the embeddings characterizing a first subset of the texts and locations of the first subset of the texts and a second set of the embeddings characterizing a second subset of the texts that are masked and additional locations of the second subset of the texts that are masked, generating additional embeddings characterizing contents of the second subset of the texts, generating relevance values based on a comparison, identifying, for each of the additional locations of the second subset of the texts that are masked, a respective content of the second subset of the texts having a reference value that is higher than a remaining relevance values, and outputting each of the respective content.

20 Claims, 7 Drawing Sheets

Westhouse Consulting GmbH • Parkring 6 • 85748 Garching/Munchen • Germany

SAP Belgium S.A.
c/o AP Department
Ch. de la Hulpe
Terhulpsesteenweg 166
1170 [1] 302
BELGIEN

WESTHOUSE CONSULTING GMBH
Department: Office Management
Phone: +49 (0) 89 383 772 0
Fax: +49 (0) 89 997 407 79
contact@westhouse.consulting.com
www.westhouse-group.com ISO ZERTIFIZIERT nach DIN EN ISO 9001:2015

Page 1

Invocie

| Invocie number | 378984 |
| --- | --- |
| Date | [2] 17010000 — 304 |
| Customer ID | BE0441797980 |
| Ihre Ust-IdNr. | 31.05.2020 |
| Delivery date | MSP20_C511127 |
| Contract number | 23.03.2020 |
| Period from | 24.03.2020 |
| Period to | Lupe Rodriguez |
| Contract person | SAPXWO0067894 |
| Customer PO | |

| Pos | Amount | Unit | Article | VAT% | Price | Value EUR |
| --- | --- | --- | --- | --- | --- | --- |
| 1 | 16,00 [3] 308 | hours | Dries Vlaeminck<br>BOD405 workshop<br>Time Sheet: SAPXTS00584601<br>SAP Belgium | 0 | 115,25 | 1.844,00 [3] 306 |

Grand total

Payment: Payme [4] 0 days

Please submit the total amount to the following bank account:
Bank: Hypovereinsbank Munchen
Bank: Hypovereinsbank Munchen
Account: 38209760
Bank ID: 700 202 70
SWIFT: [5] 310
IBAN:
Country: Germany REGISTEREINTRAG
Amtsgericht Munchen HRB-142106 • St-Nr.143/192/30174 • VAT DE 220208888-0
NASSAUISCHE SPARKASSE       BW BANK
IBAN DE27 5105 0015 0159 0698 89   IBAN DE57 6005 0101 0004 351614
BIC   NASSDE55XXX            BIC   SOLADEST600

GESCHAFTSFUHRUNG
Ebba Hickle
UNICREDIT BANK AG
IBAN DE83 7002 0270 0038 2097 60
BIC   HYVEDEMMXXX

STADTSPARKASSE MUNCHEN
IBAN DE29 7015 0000 1000 8498 18
BIC   SSHMDEMMXXX

FIG. 3

TRAINING OF MACHINE LEARNING MODELS USING CONTENT MASKING TECHNIQUES

TECHNICAL FIELD

The subject matter described herein generally relates to the training of a machine learning model.

BACKGROUND

Machine learning models are utilized in a variety of fields and technology areas such as voice recognition and natural language processing, analyzing text feeds associated with various social media platforms, image and video content recognition and analysis, digital document processing and analysis, and so forth. The training of these machine learning models involves the use of different types of training data. In order to improve or maximize the accuracy of these machine learning models, the training data upon which these models are trained need to be robust, varied, and precisely labeled. However, the labeling process is inefficient and error prone, as it requires individuals to manually analyze the content of the training data and complete the labeling the process.

SUMMARY

Systems, methods, and articles of manufacture, including computer program products, are provided for training a machine learning model.

In one aspect, there is provided a computer-implemented method for training a machine learning model comprising a first neural network and a second neural network, the computer-implemented method comprising: extracting, from at least one document, texts and locations of the texts in the at least one document, generating, using the first neural network, embeddings for the at least one document, a first set of the embeddings characterizing a first subset of the texts and locations of the first subset of the texts and a second set of the embeddings characterizing a second subset of the texts that are masked and additional locations of the second subset of the texts that are masked, generating, using the second neural network, additional embeddings characterizing contents of the second subset of the texts, comparing each of the additional embeddings with each of the second set of embeddings, generating relevance values based on the comparison, the relevance values representing relevances of the additional embeddings to each of the second set of embeddings characterizing the second subset of the texts that are masked, identifying, for each of the additional locations that are masked, a respective content of the second subset of the texts having a relevance value that is higher than the remaining relevance values, and outputting each of the respective content of the second subset of the texts having the value that is higher than the remaining relevance values.

In some variations, the second set of the embeddings are vectors that include numbers representing each of the additional locations of the second subset of the texts that are masked and additional numbers characterizing the texts that are masked.

In some variations, the additional numbers masked token values of the second subset of the texts and the additional embeddings characterize contents of the second subset of the texts do not include the additional locations of the second subset of the texts. In some variations, the masking of the second subset of texts comprises generating vectors representative of the second subset of the texts, the generating including: including location identifiers in the vectors that are representative of the second subset of the texts, including word identifiers in the vectors that are representative of the second subset of the texts, the word identifiers are stored in association with characters of the second subset of the texts in memory of the computer, and replacing the word identifiers of the second subset of the texts with masked tokens that are independent of the word identifiers stored in association with the characters of the second subset of the texts.

In some variations, the texts that are extracted are included as part of a training set. In some variations, the vales are in the range of −1 to 1, in which −1 represents a lowest threshold level of the relevances and 1 represents highest threshold level an additional relevance of the relevances. In some variations, the relevance values correspond to cosine similarity values.

In another aspect, a system for training a machine learning model comprising a first neural network and a second neural network, the system comprising: at least one data processor, and at least one memory storing instructions, which when executed by the at least one data processor, cause operations comprising: extracting, from at least one document, texts and locations of the texts in the at least one document, generating, using the first neural network, embeddings for the at least one document, a first set of the embeddings characterizing a first subset of the texts and locations of the first subset of the texts and a second set of the embeddings characterizing a second subset of the texts that are masked and additional locations of the second subset of the texts that are masked, generating, using the second neural network, additional embeddings characterizing contents of the second subset of the texts, comparing each of the additional embeddings with each of the second set of embeddings, generating relevance values based on the comparison, the relevance values representing relevances of the additional embeddings to each of the second set of embeddings characterizing the second subset of the texts that are masked, identifying, for each of the additional locations that are masked, a respective content of the second subset of the texts having a value that is higher than the remaining relevance values, and outputting each of the respective content of the second subset of the texts having the value that is higher than the remaining relevance values.

In yet another aspect, at least one non-transitory computer readable media storing instructions that, when executed by at least one processor, cause the at least one processor to perform operations comprising: extracting, from at least one document, texts and locations of the texts in the at least one document, generating, using a first neural network of a machine learning model, embeddings for the at least one document, a first set of the embeddings characterizing a first subset of the texts and locations of the first subset of the texts and a second set of the embeddings characterizing a second subset of the texts that are masked and additional locations of the second subset of the texts that are masked, generating, using a second neural network of the machine learning model, additional embeddings characterizing contents of the second subset of the texts, comparing each of the additional embeddings with each of the second set of embeddings, generating relevance values based on the comparison, the relevance values representing relevances of the additional embeddings to each of the second set of embeddings characterizing the second subset of the texts that are masked, identifying, for each of the additional locations that are masked, a respective content of the second subset of the texts having a value that is higher than the remaining relevance values, and outputting each of the respective content of the second subset of the texts having the value that is higher than the remaining relevance values.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the generation of a user interface for accessing one or more software applications, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations.

FIG. 3 depicts an example of how masked subject matter, such as text, is analyzed and utilized for training of the machine learning model, in accordance with some embodiments;

DETAILED DESCRIPTION

The training machine learning models involves the use of different types of training data. To improve or maximize the accuracy of these machine learning models, the training data upon which these machine learning models are trained need to be robust, varied, and precisely labeled. However, the labeling process is inefficient and time and resource intensive, as it requires individuals to manually analyze the content of the training data and complete the labeling the process. Further, manually analyzing and labeling the content or subject matter of the training data is error prone, which in turn reduces the accuracy of the machine learning models that are trained on such data.

The training data labeling process and processes utilized to train the machine learning models of the present disclosure address and overcome at least some these deficiencies. Unlike the traditional ways of preparing, labeling, and utilizing training data to train a machine learning model, the processes disclosed herein involve extracting content (e.g., text, alphanumeric characters, tables, figures, etc.) from a document (e.g., scanned documents, digital documents, and other type of electronic document), masking portions of the content included in various locations on the document, and comparing candidate content with a location in the document in which the masked content is present. Thereafter, one or more of the candidate content may be identified as satisfying a threshold level of relevance that is higher than the other candidate content, and as such, the candidate content satisfying the threshold level of relevance may be mapped as an accurate label to the masked portions in a document. Subsequent to this process, the machine learning model may be able to identify, classify, and label unlabeled texts included in various documents.

Figure 1:
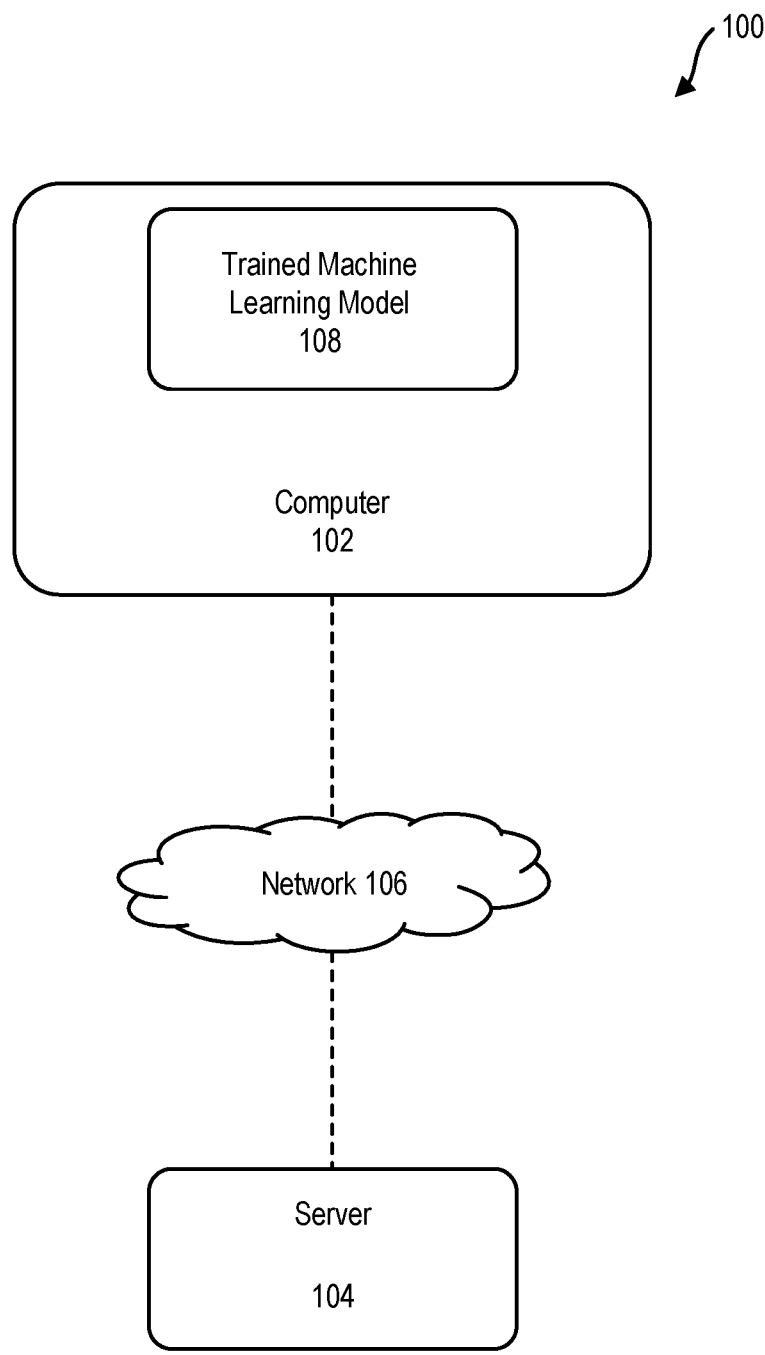
FIG. 1 depicts an example of a system including a machine learning model, in accordance with some embodiments.
Figure 6:
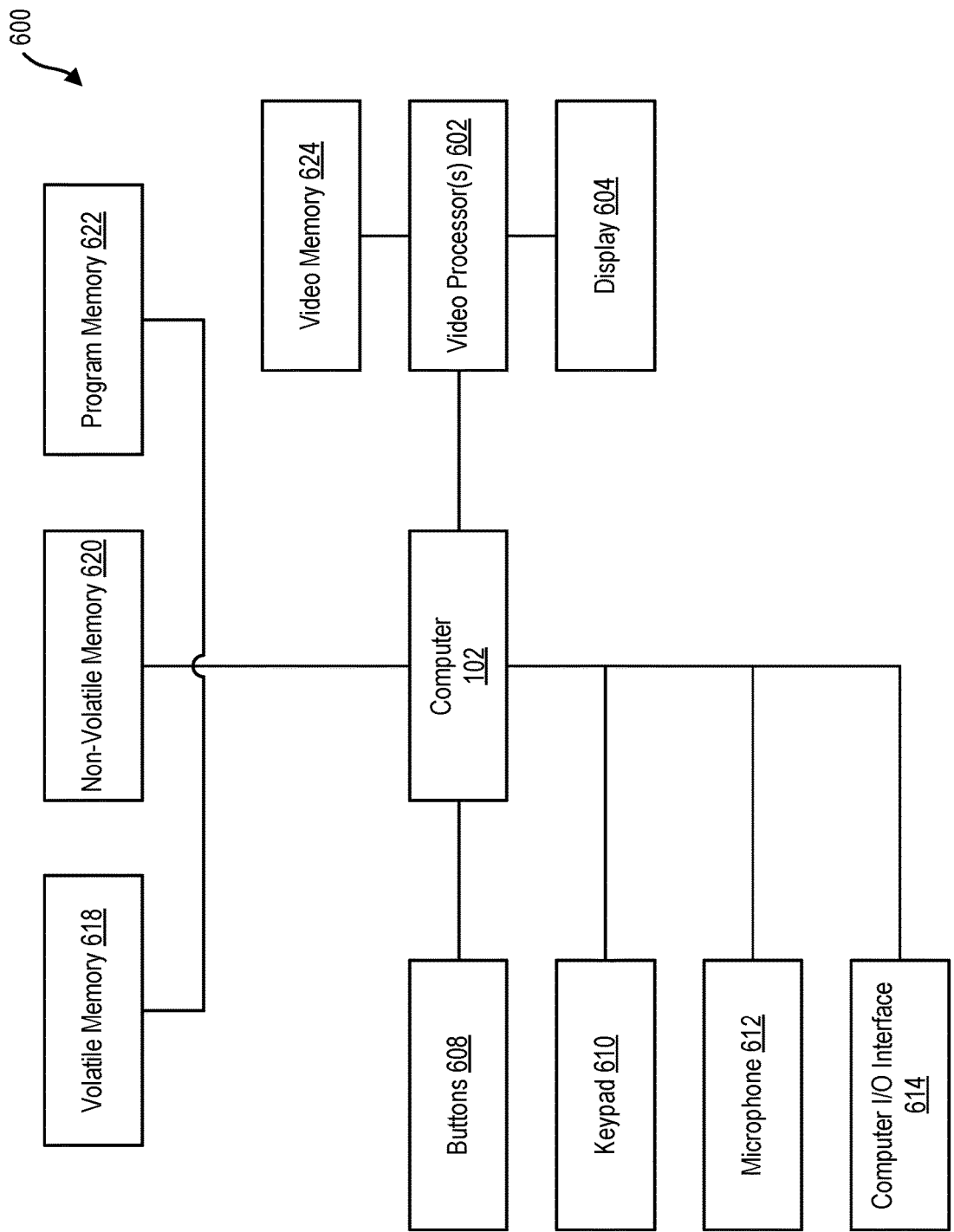
FIG. 6 depicts a computing system, in accordance with some embodiments, in accordance with some embodiments.

FIG. 1 depicts an example of a system 100 including a machine learning model 108, in accordance with some embodiments. In the depicted example, the system includes a computer 102 that is communicatively coupled to a server 104 via for example, a network 106. The communication between the computer 102 and the server 104 may occur wirelessly or via a wired connection. The computer 102 and the server 104 may each include at least one processor, at least one memory, and various additional components as illustrated in FIG. 6, for example.

The machine learning model 108 may operate as part of one or more software applications accessible via and/or operating on the computer 102 and/or the server 104 for performing various tasks, such as analyzing the content of various documents and extracting one or more text from these documents. Herein, text refers to alphanumeric characters, tables, figures, hyperlinks, and/or other objects or content found in a document, such as an electronic or scanned document. For example, an operator may select a software application operating on the computer 102, in response to which a digital page may be presented on a display to which the computer 102 is communicatively coupled. The operator may upload one or more documents such as digital documents, hand written documents that are scanned, and so forth, on the digital page that is presented. For example, bank statements, customer invoices, company receipts, and/or other documents may be uploaded via the digital page. And, the software application, using the machine learning model 108, may analyze these documents and extract various aspects from these documents. The software application, using the machine learning model 108 may extract from the document various types of text or objects, such as a company logo, a company address, items that were purchased, a price of the items, percentages of taxes, and so forth. The extracted information may then be stored (along with other data) in a database as training data to train the machine learning model 108. The extracted information may be analyzed and included as part of the training data, and as such, the total amount of training data may be dynamically updated. The above described steps and processes may occur in real time, in periodic time intervals, at a customized or user designated time frame, and so forth.

Figure 2A:
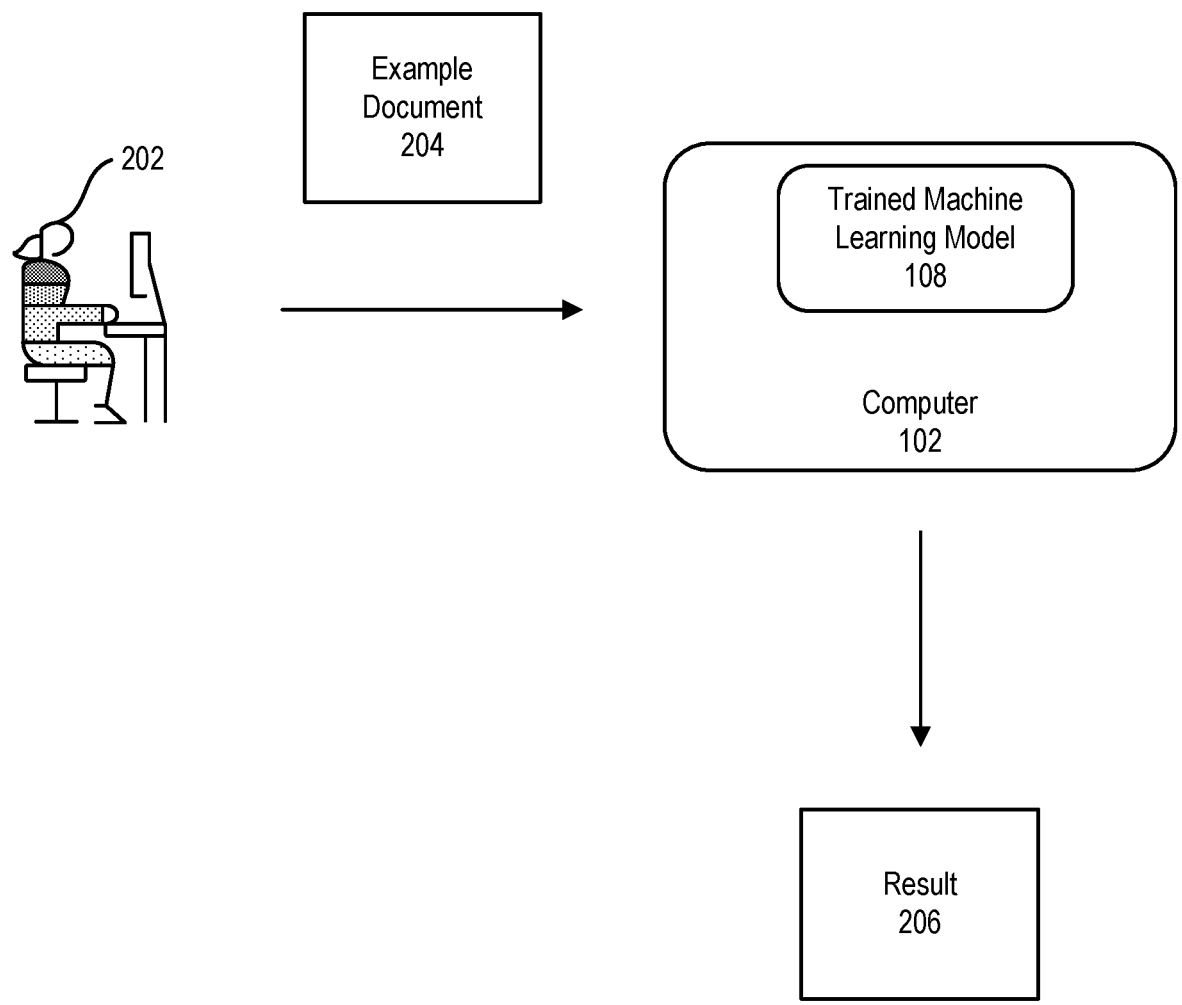
FIG. 2A depicts an example of machine learning model, in accordance with some embodiments.

FIG. 2A depicts an example implementation of the machine learning model 108, in accordance with some embodiments. For example, an operator 202 may work for a company that has various clients, such as banking institutions, construction companies, insurance companies, and so forth. These clients may provide various documents, such as invoices, receipts, purchase orders, contractual agreements, mortgage documents, insurance policy documents, and/or the like, as part of various transactions that may occur between the company and each of these clients. These documents may be generated according to different formats and common data such as characters, numbers, figures, and/or the like, that are representative of items that are purchased, prices of the items, client names, client letterheads or insignia, and so forth. But these items may not be located in the same place on the document. In operation, the items that are purchased, the item prices, client letterheads, insignia, and/or other text (or objects) may be extracted and analyzed by the machine learning model 108 to generate specific labels for each of these items.

Next, the generated labels may be matched with data extracted from various documents. Returning to FIG. 2A at an example document 204 (which is includes unlabeled unlabeled text and other data) may be uploaded or input into a software application, which in turn may generate a result 206. The result 206 may be in the form of another document that is generated in which unlabeled data from the document may be positioned adjacent to categories of labels descriptive of the data included in the unlabeled document. For example, a text (or other object) extracted from document 204 may be "MUC", but this text is unlabeled in the sense that "MUC" is not mapped in a training data set to a label used in supervised or semi-supervised learning or training. A label may need to satisfy a threshold level of accuracy, so that the label accurately reflects or relates to the extracted text to which it is mapped. Referring to the "MUC" example, the extracted text for "MUC" may be mapped to the label "Munich" and added to the training set. The training set may also include text for "Munich" and "München", both of which may be mapped to the label "Munich" in the training set.

Figure 2B:
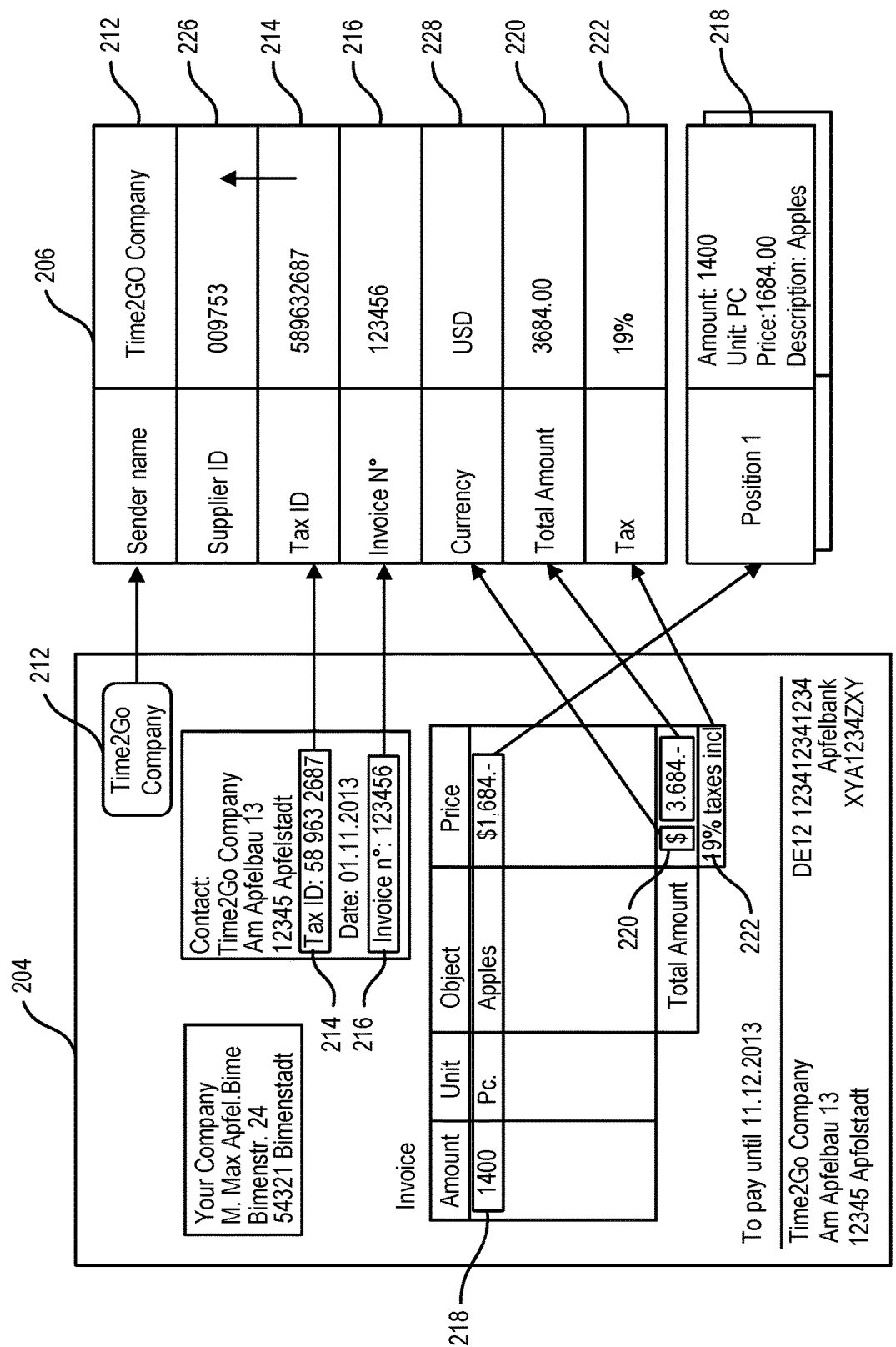
FIG. 2B depicts an example of a document that is uploaded onto a software application that operates in conjunction with a machine learning model, in accordance with some embodiments.

FIG. 2B depicts an example of a document 204 that may be uploaded onto a software application that operates in conjunction with the machine learning model 108 and text (e.g., objects, logos, and/or other items which may be contained or included in a document) that may be extracted from the document 204, in accordance with some embodiments. As illustrated in FIG. 2B, the document is an invoice of a particular company. Upon uploading the document 204 into the software application, the application, using the machine learning model 108, identifies and extracts company name 212, tax identification number 214, invoice number 216, invoice line item 218, total price 220, and tax amount 222, and/or other information included in the example document 204.

The document 204 may be an invoice of a new client, and as such, a company (which receives the document) may not have any document records associated with the new client in the company's database. In one scenario, a new client may transfer thousands of different types of documents (e.g., invoices, purchase orders, contracts, etc.), each of which conforms to various formats, document configurations, etc., that are unique to the new client. As such, when originally received, these documents are unclassified and lack appropriate labels within the systems and/or databases of the company. In other words, the software application does not include data field classifications that can be said to precisely describe all pertinent data included in these newly received documents.

To accurately label and classify these documents, the machine learning model 108, automatically and without user intervention, generates or predicts labels of various data fields or characteristics, which describe data included in the new client documents. The predicted labels may then be compared with subject matter or data included in the new documents and appropriate or correct content may be matched with the predicted labels. As the machine learning model 108 operates at a high level of accuracy (e.g., approximately 80% or more), the machine learning model 108 facilitates the extraction and accurate labeling and classification of a large amount of unlabeled and unclassified documents in a fraction of the time that it would take if labeling process occurred manually.

As illustrated in FIG. 2B, various fields may be accurately predicted and data included in the document 204, one of the documents of the new client, may be classified in association with these categories. For example, the predicted categories may include "Sender Name", "Supplied ID", "Tax ID", "Invoice Number", "Currency", "Total Amount", "Tax", and "Position 1". Next, the software application, using the machine learning model 108, may classify the name of the new client, which is listed on the letterhead of the document 204, next to the "Sender Name", as shown in the result 206 (e.g., a table). Further, the company name 212, the tax identification number 214, the invoice number 216, the invoice line item 218, the total price 220, the tax amount 222, the supplier identification number 226, the currency character 228 may each be accurately included in a text field adjacent each respective predicted label, as illustrated in FIG. 2B. The result 206 is depicted in the form of a table for illustrative purposes only. Further, the data extracted from the document 204 may be stored in formats or configurations that vary from a table, e.g., the data may be stored in memory locations and matched to the memory locations in which the predicts labels are stored.

FIG. 3 depicts aspects of the training of the machine learning model 108, in accordance with some embodiments. For example, an example invoice 300 may include text and various other characters (e.g., alphanumeric characters, words, numbers, icons, and/or other text fields). One or more texts may be extracted from the invoice 300 (e.g., which may be in real time, over periodic time intervals, and so forth). The extraction of the texts involves the implementation of an Optical Character Recognition (OCR) based software application on the invoice 300. A variety of OCR based software applications are currently available, including simple optical character recognition, intelligent character recognition, intelligent word recognition, optical mark recognition, and so forth.

Broadly speaking, as a result of the implementation of the OCR based software application on the invoice 300, pattern matching and feature extraction processes may implemented on the contents of the invoice 300. As a result, text, figures, alphanumeric characters, etc., which are included in the invoice 300 may be isolated, converted into a particular type of data, and compared with a database or stored data to identify the text, figures, alphanumeric characters, and so forth. A part of the implementation of the OCR based software application may also involve analyzing the subject matter of the invoice 300—alphanumeric characters, words, numbers, icons, etc.—from various angles and at different levels in order to identify different image attributes, such as curves, lines, intersections, and loops, and so forth. In this way, the contents or subject matter of the invoice 300 and the locations of the contents or subject matter within the invoice 300 may be extracted and stored in a database. The locations of the contents or subject matter may be precise x and y coordinate values that identify the positions of the characters, words, numbers, icons, etc., in the invoice 300.

Thereafter, as part of the training of the machine learning model 108, a subset of the extracted subject matter may be randomly selected for masking, e.g., texts 302, 304, 306, 308, and 310 (which are located in various parts of the invoice 300). For example, the texts that are masked may include city name, zip code, address of a company, price of an item, and so forth. The masking of the texts 302, 304,

306, 308, and 310 is implemented by a first encoder (e.g., a first neural network) of the machine learning model 108, which may generate embeddings associated with all of the texts that are extracted from the example invoice 300. These embeddings correspond to vectors that include a plurality of elements (e.g., numbers). A first set of these embeddings may represent unmasked texts, which may be represented by a vector that includes a word identifier and various coordinate values. The syntax of the vector may be represented as, e.g., [word identifier, $X_1$, $Y_1$, $X_2$, $Y_2$]. A second set of these embeddings may represent masked text, which may involve replacing the number associated with the word identifier with another number representing a masked token.

The element or number represented by the word identifier is stored in association with the word that is masked such that if the masked term is "SAP", the word identifier may be a number such as 223 that is stored in a database in association with the term "SAP." As part of the masking, the word identifier (e.g., the number 223) is replaced with a masked token (e.g., another number such as 111) that is a placeholder and is not associated with or connected to the masked text (e.g., SAP). The vectors corresponding to the masked embeddings may be based on the following syntax: [masked token, $X_1$, $Y_1$, $X_2$, $Y_2$]. As such, when the machine learning model 108 is implemented and processes or analyzes the number 111, the machine learning model 108 may not be able to associate or identify the text "SAP" from the number 111. In this way, the subject matter of "SAP" is hidden from the machine learning model 108.

The next steps in the training of the machine learning model 108 involves a second encoder (e.g., a second neural network) generating additional embeddings that define the subject matter of the masked text. Additional details regarding the training of the machine learning model 108 are described below with respect to FIG. 4.

Figure 4:
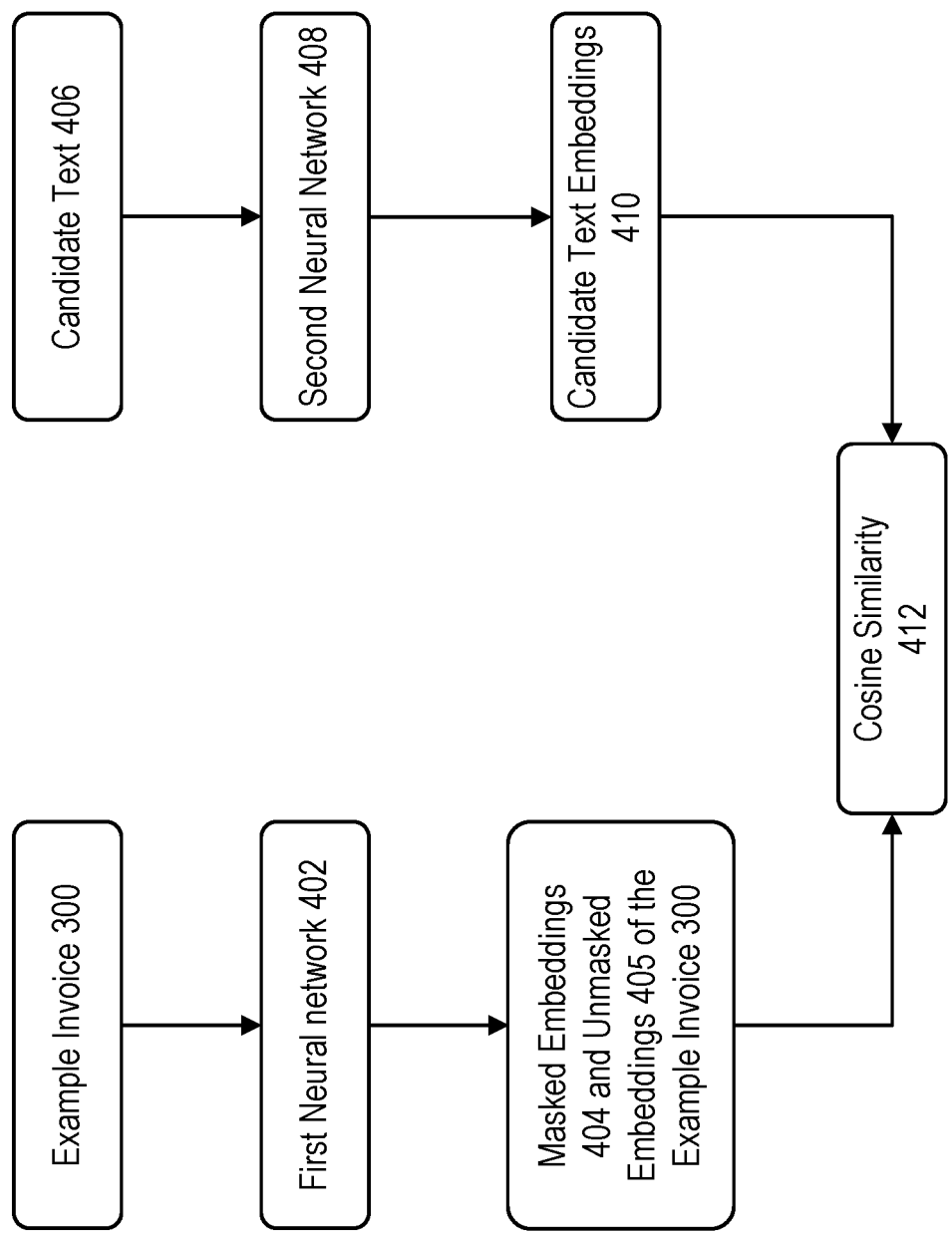
FIG. 4 depicts aspects of the training of the machine learning model that involves determining cosine similarity between various embeddings, in accordance with some embodiments.

FIG. 4 depicts aspects of the training of the machine learning model 108 that involves determining cosine similarity between various embeddings, in accordance with some embodiments. As shown in FIG. 4, extracted text from the example invoice 300 is input into a first neural network 402, which outputs masked embeddings 404 and unmasked embeddings 405 of the text extracted from the example invoice 300. The format of the embeddings and the masking of the text are described above with respect to FIG. 3 and below with respect to FIG. 5.

Further, subject matter of the texts that are masked (e.g., candidate text 406) are input into a second neural network 408, which outputs candidate text embeddings 410. The candidate text embeddings correspond to vectors that correspond to the following syntax: [word identifier]. As such, the candidate text embeddings 410 that are generated include only the word identifiers that define the text that are masked, while the masked embeddings 404 include the locations of the masked text and a masked token that is included in the embeddings in the place of the word identifier. Thereafter, a cosine similarity 412 operation may be performed between the candidate text embeddings 410 and the masked embeddings 404. In particular, the cosine similarity 412 operation generates relevance values that are representative of the relevance of the candidate text with the location of the masked text in the example invoice 300. In particular, these relevance values are in a range from −1 to 1, with −1 representing a least amount of relevance between a candidate text embedding of the candidate text embeddings 410 and a particular masked location and 1 representing a highest amount of relevance between a candidate text embedding of the candidate text embeddings 410 and the particular masked location.

For example, if the text of "SAP" is masked in the example invoice 300, and the candidate text embeddings 410 represent the texts of, e.g., SAP, Company, Berlin, 2022/21/02, and Tax, cosine similarity 412 operations may be performed between the candidate text embeddings representing SAP, Company, Berlin, 2022/21/02, and Tax and at least one of the masked embeddings 404, e.g., the masked embedding representing the text of SAP. One of the masked embeddings representing the text of SAP, as stated above, may be defined by a vector such as [masked token, $X_1$, $Y_1$, $X_2$, $Y_2$]. According to this vector, the numbers representing $X_1$, $Y_1$, $X_2$, $Y_2$ represent the coordinates of the text SAP and the masked token representing a number that is not connected to the text SAP. The result of the cosine similarity 412 operation may be the generation of relevance values, e.g., similarity values, which range from −1 to 1. For example, if the candidate text embeddings of SAP, Company, Berlin, 2022/21/02, and Tax, are compared to the masked location of the text "SAP", then the candidate text embeddings of SAP may have a relevance value of 1 and the date of 2022/21/02 may have the relevance value of −1. Further, the candidate text embedding of Company may have a relevance value of 0.5 and the candidate text embedding of Berlin may have a value of, e.g., −0.2. Using these relevance values, the machine learning model 108 may be able to use the relevance values to rank the relevance of each of the texts SAP, Company, Berlin, 2022/21/02, and Tax with the masked location.

The various aspects included in the training of the machine learning model 108 are based, in part, on the use of a contrastive loss calculation algorithm. An expression that encapsulates the contrastive loss calculation algorithm is as follows:

$$L_N = -E_x\left[\log\frac{\exp(q(x)^T k(x^+))}{\exp(q(x)^T k(x^+)) + \sum_{j=1}^{N-1}\exp(f(x)^T f(x_j))}\right] \quad (1)$$

In this algorithm, the variable of "x" is a match word for the variable "x." The variable "q" is associated with a particular type of encoder—a charmer encoder—and the variable "k" is associated with another type of encoder—a word and charmer encoder. Further, the variable "N" is a batch size. In operation, the contrastive loss calculation algorithm is implemented such that the machine learning model 108 is trained until a loss value associated with the machine learning model 108 converges with a validation loss. Further, a pre-trained weight value is reused for the purpose of fine tuning and further training the document data extraction process. The machine learning model 108 learns about correlations of textual content and their respective positions in a self-supervised manner, which accelerates the training process (i.e. improves the training phase of the machine learning mode 108), which improves the accuracy with which information is extracted and classified.

Figure 5:
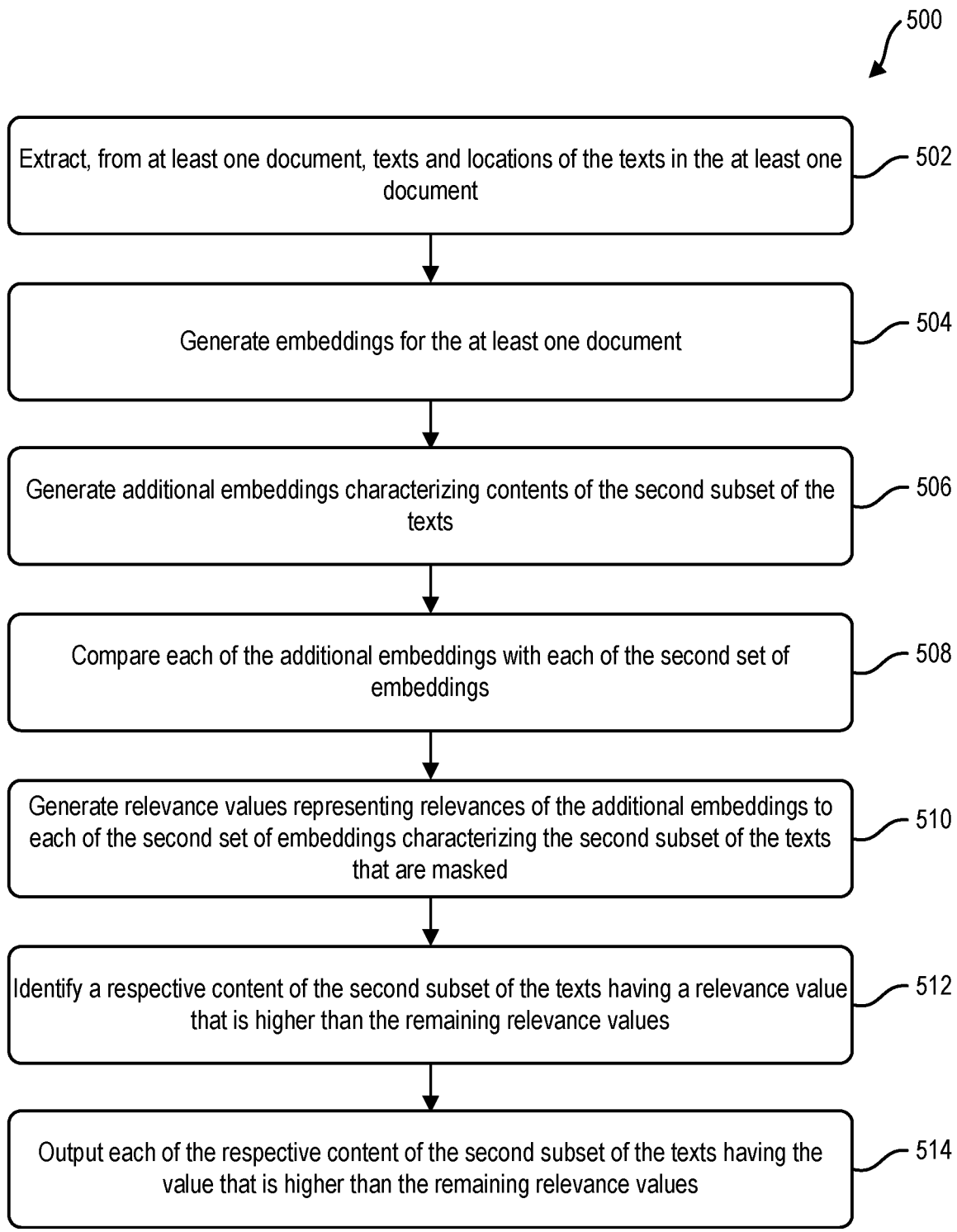
FIG. 5 depicts a flow diagram for training of the machine learning model, in accordance with some embodiments.

FIG. 5 depicts a flow diagram 500 for the training of the machine learning model 108, in accordance with some embodiments.

At block 502, texts and locations of the texts in at least one document of a plurality of documents are extracted. As illustrated in FIGS. 2B and 3, various types of text included in the invoice such as, e.g., company name, tax identification number, invoice number, invoice line item, total price, and tax amount, and so forth, may be identified and extracted. The extraction may occur in real time, in periodic intervals, over a specified time frame, and so forth. In aspects, locations of the texts are represented by coordinates. As described above, with respect to FIG. 4, the coordinates may be The coordinates may define a bounded area or perimeter that surrounds the various types of texts, in addition to describing the precise location of the text within the bounded areas. For example, the at least one document may be a two-dimensional document and the coordinates may be correspond to (x, y) values that indicate the locations of the texts in the 2D document.

The extraction of the text from the at least one document of the plurality of documents and the locations of the extracted text may involve the use of an optical character recognition operation on the at least one document. A plurality of optical character recognition software applications, operations, processes are contemplated. Further, as described above, the extracted text may not have labels that enable the text to be classified and stored within one or more databases of a company. The text that is extracted may be included as part of the training set from which the plurality of candidate text may be selected. As part of the text extraction process, areas or bounding boxes may be utilized to demark the perimeters around texts, numbers, and so forth, that are included in the at least one document. These bounding boxes, which may be generated and utilized by one or more of the OCR based software applications described above, may be utilized to identify the locations of the texts, numbers, and so forth, that are included in the at least one document.

At block 504, embeddings may be generated for the at least one document by a first neural network of the machine learning model. For example, the at least one document may be a two dimensional document that includes various types of text as described regarding block 502 and as illustrated in FIG. 3. The extracted texts and their respective locations may be input into the first neural network, which may encode or generate embeddings of these texts and their respective locations. The embeddings are vectors with various elements (e.g., numbers) that represent (1) the locations of all of the extracted text and (2) content of the text. For example, a particular embedding may be a vector (which corresponds to a word identifier) and locations of the word identifier, such that the word identifier is a numeric representation of a particular word and the location identifiers are multiple x and y coordinates representative of the locations of the particular word in the two dimensional document. As part of the text extraction process, areas or bounding boxes An example syntax of such a generated embedding may be [word identifier, $X_1$, $Y_1$, $X_2$, $Y_2$]. Each of the extracted texts may include a respective word identifier and location identifiers. The machine learning model may be able to determine the subject matter or content of a particular word based on the word identifier, which may be stored as part of a database, in memory, and in relation to a particular word. For example, the database may include distinct word identifiers of 223, 225, 227 for words such as SAP, Company, Bank, and so forth, such that when the machine learning model 108 analyzes or processes a word "SAP", the model may access the respective word identifier 223 and generate an embedding for the word "Invoice" such as [223, 30, 40, 45, 55]. The numbers 30, 40, 45, and 55 may correspond to the coordinates of $X_1$, $Y_1$, $X_2$, and $Y_2$ for the word "Invoice." In this way, embeddings may be generated for all of the extracted texts.

In aspects, the embeddings that are generated at 504 may include a first set of embeddings that characterize a first subset of texts and locations of the first subset of texts. The first set of embeddings may include vectors with word identifiers and coordinate locations of various words. Additionally, in aspects, the embeddings that are generated at 504 may include a second set of embeddings characterizing a second subset of the texts that are masked and additional locations of the second subset of the texts that are masked. Generating the second subset of embeddings (e.g., masked embeddings) includes generating vectors in which a particular word identifier of a particular word—SAP—may be replaced with a masked token identifier that serves as a placeholder and prevents the machine learning model from identifying or determining the content of the word. For example, the second set of embeddings may include a vector in which the word identifier of 223, which represents "SAP", may be replaced with a masked token that may be another default number such as, e.g., 111. When the machine learning model 108 processes or analyzes the number 111, the model will unable to link the number 111 with the word SAP, and in this way, the content of the word "SAP" may be hidden from the machine learning model 108. In this way, five texts from the extracted texts may be masked such that the word identifiers specific to these words may be replaced with different masked tokens. The second set of embeddings will include, however, coordinates indicating the locations of each of the five texts, in addition to the masked tokens representing the five texts. The five texts that are selected from the extracted texts for masked may be chosen or selected at random.

At block 506, additional embeddings may be generated using a second neural network of the machine learning model. These additional embeddings include vectors with numbers that represent the content of the five masked texts identified and which characterize contents of the second subset of the texts. While a masked texts that are discussed are five, the number of masked texts that are used may vary. The additional embeddings may include the word identifiers of the five masked texts that are stored in memory. Additionally, the additional embeddings do not include the locations of the five masked texts. These embeddings only include the word identifier of the five masked texts. For example, the additional embeddings may be vectors that follow the following format—[word identifier]. While a masked texts that are discussed are five, the number of masked texts that are used may vary.

At block 508, each of the additional embeddings characterizing the second subset of the texts may be compared with each of the embeddings of the second subset of texts. For example, if the masked texts that are included as part of the second subset of texts are SAP, Company, Berlin, 2022/21/02, and Tax, the embeddings of the second subset of texts that are generated by a first neural network may have the following vector syntax [masked token, X1, Y1, X2, Y2]. As such, each embeddings of the second subset of texts that are generated by the first neural network may a respective masked token that hides the content of each of the second subset of texts from the machine learning model 108.

Each of these embeddings (including the masked token) may be compared with each of the additional embeddings characterizing the second subset of the texts. These additional embeddings may have the following vector syntax [word identifier] and may not include the location of the masked texts. Thereafter, each of the additional embeddings (having the vector syntax of [word identifier]) are compared to each of the embeddings of the second subset of texts (having vector format of [masked token, X1, Y1, X2, Y2]). The comparison involves the determination of cosine proximities between each of the additional embeddings (having the vector syntax of [word identifier]) and each one of the embeddings (having vector format of [masked token, X1, Y1, X2, Y2]). The cosine proximities are defined as relevance values ranging from −1 to 1. These relevance values define a relevance or similarity between each of the additional embeddings with each one of the embeddings.

At block 508, relevance values are generated based on the comparison performed at block 508, namely values that are representative of relevances of the additional embeddings to each of the additional locations of the second subset of the texts. As stated above, the relevances correspond to cosine similarity values that are determined between embeddings of the second subset of texts and additional embeddings. If a cosine similarity—a measure of similarity between two vectors—is above a particular threshold, an additional embeddings may be determined to be relevant to a particular embedding. For example, if a distance metric between two embeddings satisfies a threshold distance level of 8, which is close to the maximum value of 1 and far away from the minimum value of −1, the two embeddings may be considered relevant. Further the relevance may be defined by a value of 0.8.

For instance, if the five masked texts are SAP, Company, Berlin, 2022/21/02, and Tax, the relevance values correspond to the relevances of each of the texts SAP, Company Invoice, Berlin, 2022/21/02, and Tax to a masked location of a particular masked text, e.g., the masked text of SAP. As such, the text of SAP will have the highest relevance while the date 2022/21/02 may have the lowest relevance. Such comparisons occur with respect to each of the five masked texts. With respect to the relevances, it is noted that the relevance values defining the relevances are determined using a cosine similarity operation.

At block 510, a respective content of the second subset of the texts having a value that is higher than the remaining relevance values may be identified for each of the additional locations of the second subset of the texts. For example, after comparing each of the additional embedding with each of the additional locations of the second subset of texts, which correspond to the locations of the masked texts, as described in block 504, the relevance values in a range of −1 to 1 may be generated. For example, as stated with respect to block 510 above, for the masked text of SAP, the relevance values for the content of SAP, Company, Berlin, 2022/21/02, and Tax, may be generated and may represent the suitability of SAP, Company, Berlin, 2022/21/02, and Tax relative to the location of the text "SAP." As such, the term SAP will have the highest value (e.g., relevance value) of 1 while the date 2022/21/02 may have the lowest value (e.g., relevance value) of −1. The relevance values of the remaining text may range somewhere between −1 and 1.

At block 512, a respective content of the second subset of the texts having a value that is higher than a remaining relevance values may be identified. For example, subsequent to generation of the relevance values as described in block 510, for the masked location of the text SAP, the machine learning model 108 may learn to automatically identify text having a value of 1, which has the highest relevance. In aspects, the machine learning model 108 may learn to automatically text having the highest value of 1 and then text having the next two highest relevance values.

At block 514, each of the respective content of the respective content of the second subset of the texts having the value that is higher than the remaining relevance values is output. For example, the text having the highest value, which is representative of the highest relevance of a particular text to a masked location, may be output on a display that is communicatively coupled to a computing device on which the machine learning model 108 operates.

FIG. 6 depicts a computing system 600 that may implement the machine learning model 108, according to some embodiments, in accordance with some embodiments. The computing system may include the computer 102 that is communicatively coupled (wired or wirelessly coupled) to a display 604, a keypad 610 (e.g., a keyboard) one or more sensors implanted in the brain of a patient, and one or more brain machine interfaces that are external to the computer 102. The computer 102 may also include video processors 602, buttons 608, a microphone 612, a computer input/output interface 614, memory in the form of volatile memory 618, non-volatile memory 620, and program memory 622.

The video processors 602 can provide/receive commands, status information, streaming video, still video images, and graphical overlays to/from the computer 102 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The computer 102 can be used to manage the user interface by receiving input via buttons 608, keypad 610, and/or microphone 612, in addition to providing a host of other functions, including image, video, and audio storage and recall functions, system control, and measurement processing. The buttons 608 and/or keypad 610 also can be used for menu selection and providing user commands to the server 104 (e.g., freezing or saving a still image).

The video processors 602 can also communicate with video memory 624, which is used by the video processors 602 for frame buffering and temporary holding of data during processing. The computer 102 can also communicate with program memory 622 for storage of programs executed by the computer 102. In addition, the server 104 can be in communication with the volatile memory 618 (e.g., RAM), and the non-volatile memory 620 (e.g., flash memory device, a hard drive, a DVD, or an EPROM memory device). The non-volatile memory 620 is the primary storage for streaming video and still images.

The computer 102 can also be in communication with a computer input/output interface 614, which provides various interfaces to peripheral devices and networks, such as USB, Firewire, Ethernet, audio I/O, and wireless transceivers. This computer input/output interface 614 can be used to save, recall, transmit, and/or receive still images, streaming video, or audio. For example, a USB "thumb drive" or CompactFlash memory card can be plugged into computer input/output interface 614. In addition, the computing system 600 can be configured to send frames of image data or streaming video data to an external computer or server. The computing system 600 can incorporate a TCP/IP communication protocol suite and can be incorporated in a wide area network including a plurality of local and remote computers, each of the computers also incorporating a TCP/IP communication protocol suite.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Further non-limiting aspects or embodiments are set forth in the following numbered examples:

Example 1: A computer-implemented method for training a machine learning model comprising a first neural network and a second neural network, the computer-implemented method comprising: extracting, from at least one document, texts and locations of the texts in the at least one document, generating, using the first neural network, embeddings for the at least one document, a first set of the embeddings characterizing a first subset of the texts and locations of the first subset of the texts and a second set of the embeddings characterizing a second subset of the texts that are masked and additional locations of the second subset of the texts that are masked, generating, using the second neural network, additional embeddings characterizing contents of the second subset of the texts, comparing each of the additional embeddings with each of the second set of embeddings, generating relevance values based on the comparison, the relevance values representing relevances of the additional embeddings to each of the second set of embeddings characterizing the second subset of the texts that are masked, identifying, for each of the additional locations that are masked, a respective content of the second subset of the texts having a relevance value that is higher than the remaining relevance values, and outputting each of the respective content of the second subset of the texts having the value that is higher than the remaining relevance values.

Example 2: The computer-implemented method of example 1, wherein the second set of the embeddings are vectors that include numbers representing each of the additional locations of the second subset of the texts that are masked and additional numbers characterizing the texts that are masked.

Example 3: The computer-implemented method of example 1 or example 2, wherein the additional numbers represent masked token values of the second subset of the texts, and the additional embeddings characterizing contents of the second subset of the texts do not include the additional locations of the second subset of the texts.

Example 4: The computer-implemented method of examples 1-4, further comprising masking the second subset of the texts by generating vectors representative of the second subset of the texts, the generating including: including location identifiers in the vectors that are representative of the second subset of the texts, including word identifiers in the vectors that are representative of the second subset of the texts, the word identifiers are stored in association with characters of the second subset of the texts in memory of the computer, and replacing the word identifiers of the second subset of the texts with masked tokens that are independent of the word identifiers stored in association with the characters of the second subset of the texts.

Example 5: The computer-implemented method of examples 1-4, wherein the extracting comprises performing an optical character recognition operation on the at least one document.

Example 6: The computer-implemented method of examples 1-5, further comprising including the texts that are extracted as part of a training set.

Example 7: The computer-implemented method of examples 1-6, wherein the values are in a range from −1 to 1.

Example 8: The computer-implemented method of examples 1-7, wherein −1 represents a lowest threshold level of a relevance of the relevances and 1 represents a highest threshold level of an additional relevance of the relevances.

Example 9: The computer-implemented method of examples 1-8, wherein the relevance values correspond to cosine similarity values.

Example 10: A system for training a machine learning model comprising a first neural network and a second neural network, the system comprising: at least one data processor, and at least one memory storing instructions, which when executed by the at least one data processor, cause operations comprising: extracting, from at least one document, texts and locations of the texts in the at least one document, generating, using the first neural network, embeddings for the at least one document, a first set of the embeddings characterizing a first subset of the texts and locations of the first subset of the texts and a second set of the embeddings characterizing a second subset of the texts that are masked and additional locations of the second subset of the texts that are masked, generating, using the second neural network, additional embeddings characterizing contents of the second subset of the texts, comparing each of the additional embeddings with each of the second set of embeddings, generating relevance values based on the comparison, the relevance values representing relevances of the additional embeddings to each of the second set of embeddings characterizing the second subset of the texts that are masked, identifying, for each of the additional locations that are masked, a respective content of the second subset of the texts having a value that is higher than the remaining relevance values, and outputting each of the respective content of the second subset of the texts having the value that is higher than the remaining relevance values.

Example 11: The system of example 10, wherein the second set of the embeddings are vectors that include numbers representing each of the additional locations of the second subset of the texts that are masked and additional numbers characterizing the texts that are masked.

Example 12: The system of example 10 or example 11, wherein the additional numbers represent masked token values of the second subset of the texts.

Example 13: The system of any of examples 10-12, wherein one of the operations of the masking of the second subset of the texts comprises: generating vectors representative of the second subset of the texts, the generating including: including location identifiers in the vectors that are representative of the second subset of the texts, including word identifiers in the vectors that are representative of the second subset of the texts, the word identifiers are stored in association with characters of the second subset of the texts in memory of the computer, and replacing the word identifiers of the second subset of the texts with masked tokens that are independent of the word identifiers stored in association with the characters of the second subset of the texts.

Example 14: The system of any of examples 10-13, wherein one of the operations of extracting, from at least one document, the texts and the locations of the texts in the at least one document comprises performing an optical character recognition operation on the at least one document.

Example 15: The system of any of examples 10-14, wherein the operations further comprise including the texts that are extracted as part of a training set.

Example 16: The system of any of examples 10-15, wherein the relevance values are in a range from −1 to 1.

Example 17: The system of any of examples 10-16, wherein −1 represents a lowest threshold level of a relevance of the relevances and 1 represents a highest level of an additional relevance of the relevances.

Example 18: The system of any of examples 10-17, wherein the relevance values correspond to cosine similarity values.

Example 19: At least one non-transitory computer readable media storing instructions that, when executed by at least one processor, cause the at least one processor to perform operations comprising: extracting, from at least one document, texts and locations of the texts in the at least one document, generating, using a first neural network of a machine learning model, embeddings for the at least one document, a first set of the embeddings characterizing a first subset of the texts and locations of the first subset of the texts and a second set of the embeddings characterizing a second subset of the texts that are masked and additional locations of the second subset of the texts that are masked, generating, using a second neural network of the machine learning model, additional embeddings characterizing contents of the second subset of the texts, comparing each of the additional embeddings with each of the second set of embeddings, generating relevance values based on the comparison, the relevance values representing relevances of the additional embeddings to each of the second set of embeddings characterizing the second subset of the texts that are masked, identifying, for each of the additional locations that are masked, a respective content of the second subset of the texts having a value that is higher than the remaining relevance values, and outputting each of the respective content of the second subset of the texts having the value that is higher than the remaining relevance values.

Example 20: The at least one non-transitory computer readable media of example 19, wherein the second set of the embeddings are vectors that include numbers representing each of the additional locations of the second subset of the texts that are masked and additional numbers characterizing the texts that are masked.

What is claimed is:

1. A computer-implemented method for training a machine learning model comprising a first neural network and a second neural network, the computer-implemented method comprising:
    extracting, from at least one document, texts and locations of the texts in the at least one document;
    generating, using the first neural network, embeddings for the at least one document, a first set of the embeddings characterizing a first subset of the texts and locations of the first subset of the texts and a second set of the embeddings characterizing a second subset of the texts that are masked and additional locations of the second subset of the texts that are masked;
    generating, using the second neural network, additional embeddings characterizing contents of the second subset of the texts;
    comparing each of the additional embeddings with each of the second set of embeddings;
    generating relevance values based on the comparison, the relevance values representing relevances of the additional embeddings to each of the second set of embeddings characterizing the second subset of the texts that are masked;
    identifying, for each of the additional locations that are masked, a respective content of the second subset of the texts having a relevance value that is higher than the remaining relevance values; and
    outputting each of the respective content of the second subset of the texts having the value that is higher than the remaining relevance values.

2. The computer-implemented method of claim 1, wherein the second set of the embeddings are vectors that include numbers representing each of the additional locations of the second subset of the texts that are masked and additional numbers characterizing the texts that are masked.

3. The computer-implemented method of claim 2, wherein:
    the additional numbers represent masked token values of the second subset of the texts, and
    the additional embeddings characterizing contents of the second subset of the texts do not include the additional locations of the second subset of the texts.

4. The computer-implemented method of claim 1, further comprising masking the second subset of the texts by:
    generating vectors representative of the second subset of the texts, the generating including:
        including location identifiers in the vectors that are representative of the second subset of the texts,
        including word identifiers in the vectors that are representative of the second subset of the texts, the word identifiers are stored in association with characters of the second subset of the texts in memory of the computer, and
        replacing the word identifiers of the second subset of the texts with masked tokens that are independent of the word identifiers stored in association with the characters of the second subset of the texts.

5. The computer-implemented method of claim 1, wherein the extracting comprises performing an optical character recognition operation on the at least one document.

6. The computer-implemented method of claim 1, further comprising including the texts that are extracted as part of a training set.

7. The computer-implemented method of claim 1, wherein the relevance values are in a range from −1 to 1.

8. The computer-implemented method of claim 7, wherein −1 represents a lowest threshold level of a relevance of the relevances and 1 represents a highest threshold level of an additional relevance of the relevances.

9. The computer-implemented method of claim 8, wherein the relevance values correspond to cosine similarity values.

10. A system for training a machine learning model comprising a first neural network and a second neural network, the system comprising:
    at least one data processor; and
    at least one memory storing instructions, which when executed by the at least one data processor, cause operations comprising:
        extracting, from at least one document, texts and locations of the texts in the at least one document;
        generating, using the first neural network, embeddings for the at least one document, a first set of the embeddings characterizing a first subset of the texts and locations of the first subset of the texts and a second set of the embeddings characterizing a second subset of the texts that are masked and additional locations of the second subset of the texts that are masked;
        generating, using the second neural network, additional embeddings characterizing contents of the second subset of the texts;
        comparing each of the additional embeddings with each of the second set of embeddings;
        generating relevance values based on the comparison, the relevance values representing relevances of the additional embeddings to each of the second set of embeddings characterizing the second subset of the texts that are masked;

identifying, for each of the additional locations that are masked, a respective content of the second subset of the texts having a relevance value that is higher than the remaining relevance values; and outputting each of the respective content of the second subset of the texts having the value that is higher than the remaining relevance values.

11. The system of claim 10, wherein the second set of the embeddings are vectors that include numbers representing each of the additional locations of the second subset of the texts that are masked and additional numbers characterizing the texts that are masked.

12. The system of claim 11, wherein the additional numbers represent masked token values of the second subset of the texts.

13. The system of claim 12, wherein one of the operations of the masking of the second subset of the texts comprises:

generating vectors representative of the second subset of the texts, the generating including:

including location identifiers in the vectors that are representative of the second subset of the texts, including word identifiers in the vectors that are representative of the second subset of the texts, the word identifiers are stored in association with characters of the second subset of the texts in memory of a computer, and replacing the word identifiers of the second subset of the texts with masked tokens that are independent of the word identifiers stored in association with the characters of the second subset of the texts.

14. The system of claim 10, wherein one of the operations of extracting, from at least one document, the texts and the locations of the texts in the at least one document comprises performing an optical character recognition operation on the at least one document.

15. The system of claim 10, wherein the operations further comprise including the texts that are extracted as part of a training set.

16. The system of claim 10, wherein the relevance values are in a range from −1 to 1.

17. The system of claim 16, wherein −1 represents a lowest threshold level of a relevance of the relevances and 1 represents a highest threshold level of an additional relevance of the relevances.

18. The system of claim 17, wherein the relevance values correspond to cosine similarity values.

19. At least one non-transitory computer readable media storing instructions that, when executed by at least one processor, cause the at least one processor to perform operations comprising:

extracting, from at least one document, texts and locations of the texts in the at least one document;

generating, using a first neural network of a machine learning model, embeddings for the at least one document, a first set of the embeddings characterizing a first subset of the texts and locations of the first subset of the texts and a second set of the embeddings characterizing a second subset of the texts that are masked and additional locations of the second subset of the texts that are masked;

generating, using a second neural network of the machine learning model, additional embeddings characterizing contents of the second subset of the texts;

comparing each of the additional embeddings with each of the second set of embeddings;

generating relevance values based on the comparison, the relevance values representing relevances of the additional embeddings to each of the second set of embeddings characterizing the second subset of the texts that are masked;

identifying, for each of the additional locations that are masked, a respective content of the second subset of the texts having a relevance value that is higher than the remaining relevance values; and outputting each of the respective content of the second subset of the texts having the value that is higher than the remaining relevance values.

20. The at least one non-transitory computer readable media of claim 19, wherein the second set of the embeddings are vectors that include numbers representing each of the additional locations of the second subset of the texts that are masked and additional numbers characterizing the texts that are masked.

* * * * *